United States Patent
Moganty et al.

(10) Patent No.: US 11,050,087 B2
(45) Date of Patent: Jun. 29, 2021

(54) SILANE FUNCTIONALIZED IONIC LIQUIDS

(71) Applicant: NOHMs Technologies, Inc., Rochester, NY (US)

(72) Inventors: Surya Moganty, Henrietta, NY (US); Gabriel Torres, Rochester, NY (US); Luigi Abbate, Rochester, NY (US); John Sinicropi, Rochester, NY (US); Xiaojing Zhu, Rochester, NY (US)

(73) Assignee: NOHMS Technologies, Inc., Rochester, NY (US)

( * ) Notice: Subject to any disclaimer, the term of this patent is extended or adjusted under 35 U.S.C. 154(b) by 0 days.

(21) Appl. No.: 15/378,237

(22) Filed: Dec. 14, 2016

(65) Prior Publication Data

US 2017/0170522 A1    Jun. 15, 2017

Related U.S. Application Data

(60) Provisional application No. 62/266,761, filed on Dec. 14, 2015, provisional application No. 62/266,767, (Continued)

(51) Int. Cl.
*H01M 10/0567* (2010.01)
*H01M 10/0568* (2010.01)
(Continued)

(52) U.S. Cl.
CPC ... *H01M 10/0569* (2013.01); *H01M 10/0525* (2013.01); *H01M 10/0567* (2013.01);
(Continued)

(58) Field of Classification Search
CPC ......... H01M 10/0569; H01M 10/0568; H01M 4/485; H01M 4/5825; H01M 4/583; H01M 2300/034; H01M 2300/0037
See application file for complete search history.

(56) References Cited

U.S. PATENT DOCUMENTS

| | | | |
|---|---|---|---|
| 2002/0012850 A1* | 1/2002 | Schmidt ................ | H01M 4/133 429/324 |
| 2010/0029970 A1* | 2/2010 | West ...................... | H01G 9/038 556/405 |

(Continued)

FOREIGN PATENT DOCUMENTS

| | | |
|---|---|---|
| CA | 2776178 | 10/2013 |
| CN | 102372732 A | 3/2012 |

(Continued)

OTHER PUBLICATIONS

Shirota and Castner, 2005, "Why are viscosities lower for ionic liquids with -CH2Si(CH3)3 vs -CH2C(CH3)3 substitutions on the imidazolium cations?" J. Phys. Chem. B, vol. 109, pp. 21576-21585.

(Continued)

*Primary Examiner* — Jonathan Crepeau
*Assistant Examiner* — Angela J Martin
(74) *Attorney, Agent, or Firm* — Bond, Schoeneck & King, PLLC; Joseph Noto

(57) ABSTRACT

Silane functionalized ionic liquids are disclosed as a part of an electrolyte for an electrical energy storage device including an aprotic organic solvent; an alkali metal salt; an additive; and an ionic compound including an anion and cation, wherein the cation is attached to a functional group (Continued)

including a silane functional group according to the base Formula (I)

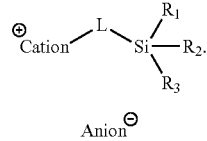

15 Claims, 2 Drawing Sheets

Related U.S. Application Data filed on Dec. 14, 2015, provisional application No. 62/266,773, filed on Dec. 14, 2015.

(51) Int. Cl.
  *H01M 10/0569* (2010.01)
  *H01M 10/0525* (2010.01)
(52) U.S. Cl.
  CPC .. *H01M 10/0568* (2013.01); *H01M 2300/004* (2013.01); *H01M 2300/0045* (2013.01)

(56) References Cited

U.S. PATENT DOCUMENTS

| | | |
|---|---|---|
| 2011/0045359 A1 | 2/2011 | Schmidt et al. |
| 2012/0082903 A1 | 4/2012 | Zhang et al. |
| 2015/0093655 A1 | 4/2015 | Kozelj et al. |
| 2015/0207176 A1* | 7/2015 | Moganty .......... H01M 10/0569 429/50 |
| 2015/2088031 | 10/2015 | Zhang et al. |
| 2015/0333374 A1 | 11/2015 | Moganty et al. |

FOREIGN PATENT DOCUMENTS

| | | | | |
|---|---|---|---|---|
| JP | 2001266962 | * | 3/2000 | ............ H01M 14/00 |
| JP | 2002208433 A | | 7/2002 | |
| JP | 2002222740 A | | 8/2002 | |
| JP | 2002260729 A | | 9/2002 | |
| JP | 2007088359 | * | 9/2005 | ............... H01G 9/38 |
| JP | 2009286699 A | | 12/2009 | |
| JP | 2010209299 A | | 9/2010 | |
| JP | 2015514717 A | | 5/2015 | |

OTHER PUBLICATIONS

International Search Report and Written Opinion Form PCT/ISA/210, International application No. PCT/US16/66498, International filing date Dec. 14, 2016, dated Feb. 17, 2017.
Extended European Search Report for Application No. 16876524.6 dated Jul. 1, 2019; 9 pages.
First Office Action; Japanese Patent Application No. 2018-524243; dated Dec. 28, 2020; 9 pages.

* cited by examiner

SILANE FUNCTIONALIZED IONIC LIQUIDS

CROSS REFERENCE

This application claims the benefit of the filing date of U.S. Provisional Patent Application Ser. No. 62/266,761, filed Dec. 14, 2015, U.S. Provisional Patent Application Ser. No. 62/266,767, filed Dec. 14, 2015, and U.S. Provisional Patent Application Ser. No. 62/266,773, filed Dec. 14, 2015, which are hereby incorporated by reference in their entirety.

FIELD

The disclosure describes ionic liquids whose organic, heterocyclic cations have appended silane moieties, and more particularly to the use of the ionic liquids and carbonate esters as a high performance, nonflammable, wide operating temperature range electrolyte formulation for electrochemical cells.

BACKGROUND

Ionic liquids are substances that are made up only from ions and have a melting point of <100° C. or are, ideally, liquid at ambient temperature. They have been incorporated within electrolytes for lithium and lithium-ion batteries, as they exhibit relatively favorable electrochemical stability and high ionic conductivity. Despite the potential advantages, ionic liquids have not been widely used as electrolytes for lithium and lithium ion batteries due to a number of significant disadvantages. Although lithium-ion cells using $LiMnO_2$ and $Li_4Ti_5O_{12}$ as electrode materials show satisfactory cycling behavior using ionic liquid as electrolyte solvent, this cell configuration suffers from the relatively small voltage of 2.5 V. In addition, the cell has low rate capability due to the high viscosity and poor wettability of the ionic liquid with electrode materials.

Moreover, early experiments to cycle lithium-ion batteries using carbonaceous negative electrode materials and ionic liquid-based electrolytes failed. Any ionic liquid sample tested was reduced at the low potential at which the intercalation of lithium into the graphite proceeds. It is believed that the reduction of the ionic liquids proceeds due to the formation of dimeric species. For commercial applications, lithium metal is, however, not advantageous. Due to the high reactivity of its surface, lithium is potentially hazardous, especially at elevated temperatures. Proposals to stabilize lithiated graphite electrodes for use in lithium-ion batteries include admixture of small amounts of highly active film forming additives. Such additives could protect against the continued reduction of the electrolyte itself at the surface of the low potential graphite. However, in most cases, the additives have issues associated with the poor solubility in ionic liquid electrolytes.

Various attempts are known in the prior art to modify ionic liquid. U.S. Pat. No. 9,093,722 to Zhang et al. discloses a functionalized ionic liquid or lithium ion battery, wherein the ionic liquid contains cations having a disiloxane moiety.

CN103515118 to Zhou discloses an electrolyte for the double-electric-layer capacitor including pyridines ionic liquid and alkyl trimethyl silane, and that the alkyl trimethyl silane can increase the affinity of the pyridines ionic liquid and the diaphragm materials, such as the PP and the PE, commonly used for capacitors.

"Spray-coatable ionogels based on silane-ionic liquids for low voltage, flexible electrolyte-gated organic transistor" to Theimann, et al. (J. Mater. Chem. C., 2014, 2, 2423-2430) discloses an ion gel including an ionic liquid having silicone alkoxide functional group attached to an imidazolium cation.

However, these references do not address the need for a high performance and nonflammable ionic liquid for use in electrolyte formulation of electrochemical cells. Therefore, there remains a need for modified ionic liquid to achieve high performance and low or non-flammability.

SUMMARY

In accordance with an aspect of the present disclosure there is provided electrolyte for an electrical energy storage device including: an aprotic organic solvent; an alkali metal salt; an additive; and an ionic compound including an ionic compound anion and ionic compound cation, wherein the ionic compound cation is attached to a functional group comprising a silane functional group according to Formula (I)

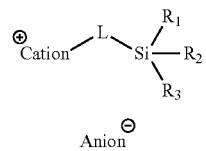

wherein the ionic compound cation includes an onium, sulfonium, phosphonium, or any 5 or 6 membered heterocyclic ring having 1 to 3 heteroatoms as ring members selected from nitrogen, oxygen, silicon or sulfur; $R_1$, $R_2$, $R_3$ are each independently $C_1$-$C_8$ alkyl, alkenyl, alkoxy, aryl, alkynyl, or alkylsiloxy groups; L is a linker, which is a $C_1$-$C_8$ alkyl, alkenyl, alkynyl, esters, carbonyl, phenyl or aryl groups, optionally having a bond to a P, halides, Si, B, S, O, or N atom, and excluding an O bond directly to the silane functional group according to Formula (I); and the ionic compound anion includes a halide, nitrate, phosphate, imide, borate, or phosphazine.

In accordance with another aspect of the present disclosure there is provided an ionic compound for an electrolyte having a second functional group attached to the ionic compound cation according to Formula (II)

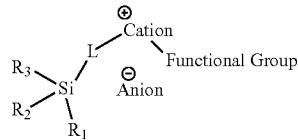

wherein, the second functional group represents a functional moiety including halides, oxygen, nitrogen, sulfur, phosphorus, alkanes, esters, ethers, ketones, carbonyls, alkoxyalkanes, alkenes, aryls, nitriles, silanes, sulfones, thiols, phenols, hydroxyls, amines, imides, aldehydes, carboxylic acids, alkynes, carbonates, or anhydrides, wherein any of the carbon or hydrogen atoms in the moieties are further substituted with halides, oxygen, nitrogen, sulfur, phosphorus, alkanes, esters, ethers, ketones, carbonyls, alkoxyalkanes, alkenes, aryls, nitriles, silanes, sulfones, thiols, phenols, hydroxyls, amines, imides, aldehydes, carboxylic acids, alkynes, carbonates, or anhydrides.

In accordance with another aspect of the present disclosure there is provided an ionic compound for an electrolyte having a second functional group attached to the ionic compound wherein the second functional group includes a second silane functional group according to Formula (III)

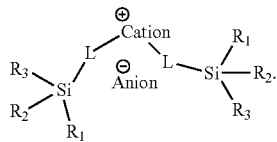

DETAILED DESCRIPTION

Figure 1:
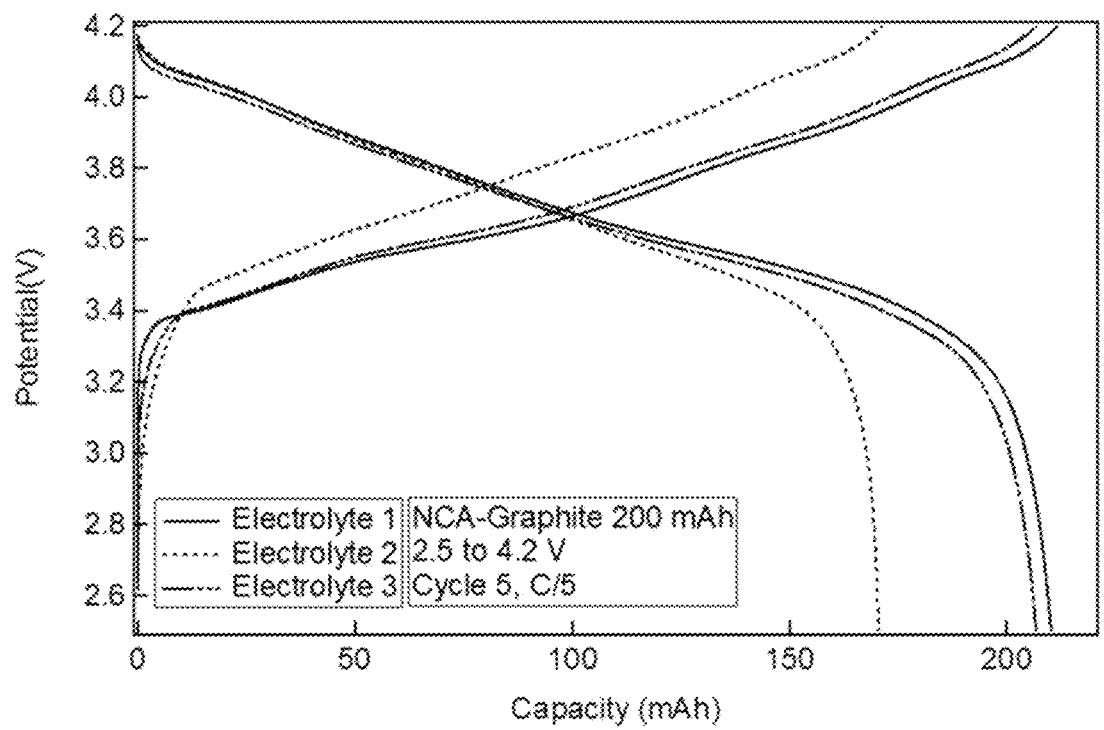
FIG. 1 is a graph of Voltage profiles for Electrolytes 1-3.

In an embodiment, this disclosure is directed to an electrolyte for electrical energy storage device including an aprotic organic solvent; an alkali metal salt; an additive; and an ionic liquid compound including an anion and cation, where the cation is attached to a silane functional group described according to Formula (I)

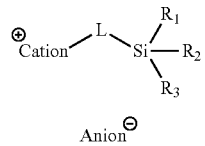

wherein the cation represents the cation of the ionic compound, which is selected from onioums, sulfoniums, phosphoniums, and any 5 or 6 membered heterocyclic ring having 1 to 3 heteroatoms as ring members selected from nitrogen, oxygen, silicon or sulfur; $R_1$, $R_2$, $R_3$ are independently $C_1$-$C_8$ alkyl, alkenyl, alkoxy, aryl, alkynyl, or alkylsiloxy groups; L is a linker, which is a $C_1$-$C_8$ alkyl, alkenyl, alkynyl, esters, carbonyl, phenyl or aryl groups, optionally having a bond to a P, halides, Si, B, S, O, or N atom, and excluding an O bond directly to the silane functional group according to Formula (I); and the anion represents the anion of the ionic compound, which is selected from halides, nitrates, phosphates, imides, borates, and phosphazines.

Suitable aprotic organic solvents for use in the electrolyte formulation include one or more open-chain or cyclic carbonates, carboxylic acid esters, nitrites, ethers, sulfones, ketones, lactones, dioxolanes, glymes, crown ethers, and mixtures thereof.

Suitable cations of the alkali metal salt include lithium, sodium, aluminum, and magnesium, preferably lithium.

Suitable additives of the electrolyte formulation include (1) sulfur-containing compounds, (2) phosphorous containing compounds, (3) boron containing compounds, (4) silicon containing compounds, (5) compounds containing an unsaturated carbon-carbon bond, (6) carboxylic acid anhydrides and, (7) mixtures thereof.

In an embodiment, the disclosure relates to ionic liquids whose organic, heterocyclic cations have appended silane and various electroactive functional moieties and the use of the ionic liquids and carbonate esters as a high performance, nonflammable, wide operating temperature range electrolyte formulation for electrochemical cells.

In an embodiment, an ionic liquid compound includes an anion and cation, where the cation is attached to silane and a functional group described according to Formula (II)

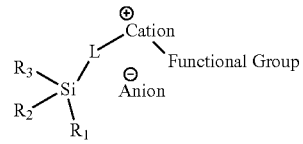

wherein the cation represents the cation of the ionic compound, which is selected from oniums, sulfoniums, phosphoniums, and any 5 or 6 membered heterocyclic ring having 1 to 3 heteroatoms as ring members selected from nitrogen, oxygen, silicon or sulfur; $R_1$, $R_2$, $R_3$ are independently $C_1$-$C_8$ alkyl, alkenyl, alkoxy, aryl, alkynyl, or alkylsiloxy groups; L is a linker, which is a $C_1$-$C_8$ alkyl, alkenyl, alkynyl, esters, carbonyl, phenyl or aryl groups, optionally having a bond to a P, halides, Si, B, S, O, or N atom, and excluding an O bond directly to the silane functional group according to Formula (II); the functional group represents a functional moiety selected from halides, oxygen, nitrogen, sulfur, phosphorus, alkanes, esters, ethers, ketones, carbonyls, alkoxyalkanes, alkenes, aryls, nitriles, silanes, sulfones, thiols, phenols, hydroxyls, amines, imides, aldehydes, carboxylic acids, alkynes, carbonates, and anhydrides, wherein any of the carbon or hydrogen atoms in the moieties are further substituted with halides, oxygen, nitrogen, sulfur, phosphorus, alkanes, esters, ethers, ketones, carbonyls, alkoxyalkanes, alkenes, aryls, nitriles, silanes, sulfones, thiols, phenols, hydroxyls, amines, imides, aldehydes, carboxylic acids, alkynes, carbonates, and anhydrides; and the anion represents the anion of the ionic compound, which is selected from halides, nitrates, phosphates, imides, borates, and phosphazines.

In an embodiment, the disclosure relates to ionic liquids whose organic, heterocyclic cations have appended di-silane moieties and the use of the ionic liquids and carbonate esters as a high performance, nonflammable, wide operating temperature range electrolyte formulation for electrochemical cells.

In an embodiment, the ionic liquid compound includes an anion and cation, where the cation is attached to di-silane functional groups described according to Formula (III)

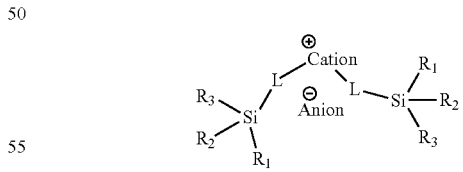

wherein, the cation represents the cation of the ionic compound, which is selected from oniums, sulfoniums, phosphoniums, and any 5 or 6 membered heterocyclic ring having 1 to 3 heteroatoms as ring members selected from nitrogen, oxygen, silicon or sulfur; $R_1$, $R_2$, $R_3$ are independently $C_1$-$C_8$ alkyl, alkenyl, alkoxy, aryl, alkynyl, or alkylsiloxy groups; L is a linker, which is a $C_1$-$C_8$ alkyl, alkenyl, alkynyl, esters, carbonyl, phenyl or aryl groups, optionally having a bond to a P, halides, Si, B, S, O, or N atom, and excluding an O bond directly to the silane functional group according to Formula (III); and the anion represents the anion of the ionic compound, which is selected from the halides, nitrates, phosphates, imides, borates, and phosphazines.

The following terms are used throughout as described below, unless context clearly indicates otherwise.

Alkyl groups include straight chain and branched chain saturated hydrocarbon groups having from 1 to 14 carbons unless indicated otherwise. For example, a $C_{1-6}$ alkyl group includes alkyl groups with 1, 2, 3, 4, 5, or 6 carbon atoms. In some embodiments, an alkyl group has from 1 to 12 carbon atoms, from to 10 carbons, from 1 to 8, 1 to 6, or 1, 2, 3 or 4 carbon atoms. Examples of straight chain alkyl groups include groups such as methyl, ethyl, n-propyl, n-butyl, n-pentyl, n-hexyl, n-heptyl, and n-octyl, n-decyl, n-dodecyl and n-tetradecyl groups. Examples of branched chain alkyl groups include, but are not limited to, isopropyl, iso-butyl, sec-butyl, tert-butyl, neopentyl, isopentyl, and 2,2-dimethylpropyl groups. Alkyl groups may be unsubstituted or are optionally substituted with one or more hydroxyl or halogen groups.

Alkylene groups are alkyl groups, as defined herein, which are divalent; i.e., they have two points of attachment to a compound of the present technology.

Aryl groups are cyclic aromatic hydrocarbons containing 6-14 carbon atoms and do not contain heteroatoms. Aryl groups herein include monocyclic, bicyclic and tricyclic ring systems, including fused rings. Thus, aryl groups include, but are not limited to, phenyl, azulenyl, heptalenyl, biphenyl, fluorenyl, phenanthrenyl, anthracenyl, indenyl, indanyl, pentalenyl, and naphthyl groups. In some embodiments, aryl groups contain from 6-12 or even 6-10 carbon atoms in the ring portions of the groups. In some embodiments, the aryl groups are phenyl or naphthyl. Aryl groups may also include fused aromatic-aliphatic ring systems, e.g., indanyl, tetrahydronaphthyl, and the like. Aryl groups may be unsubstituted or optionally substituted with one or more alkyl, halo groups or one or more halogens. In some embodiments the aryl groups are substituted with 1, 2 or 3 alkyl groups and/or 1-5 halogens.

Anion includes the groups boron tetrafluoride, aluminate, (oxalate)borate, difluoro(oxalate)borate, phosphorus hexafluoride, alkylsulfonate, fluoroalkylsulfonate, arylsulfonate, bis(alkylsulfonyl)amide, perchlorate, bis(fluoroalkylsulfonyl)amide, bis(arylsulfonyl)amide, alkyl fluorophosphate, (fluoroalkylsulfonyl)(fluoroalkylcarbonyl)amide, halide, nitrate, nitrite, sulfate, hydrogen sulfate, alkyl sulfate, aryl sulfate, carbonate, bicarbonate, carboxylate, phosphate, hydrogen phosphate, dihydrogen phosphate, hypochlorite, an anionic site of a cation-exchange resin, and a mixture of any two or more thereof. In some embodiments the counterion, $X^-$, of the ionic liquid is $[CF_3CO_2]^-$; $[C_2F_5CO_2]^-$; $[ClO_4]^-$; $[BF_4]^-$; $[AsF_6]^-$; $[PF_6]^-$; $[PF_2(C_2O_4)_2]^-$; $[PF_4C_2O_4]^-$; $[CF_3SO_3]^-$; $[N(CF_3SO_2)_2]^-$; $[C(CF_3SO_2)_3]^-$; $[N(SO_2C_2F_5)_2]^-$; alkyl fluorophosphate; $[B(C_2O_4)_2]^-$; $[BF_2C_2O_4]^-$; $[B_{12}Y_{12-k}H_k]^{2-}$; $[B_{10}Y_{10-k'}H_{k'}]^{2-}$; or a mixture of any two or more thereof, wherein Y is a halogen, k is an integer from 0 to 12 and k' is an integer from 1 to 10. Preferably, the anion is bistriflimide or bis(trifluoroethyl) sulfonide ("TFSI").

Ionic liquids of the present technology are preferably non-aqueous or substantially non-aqueous with no free water, and may be synthesized by various methods known in the art. For example, to prepare cationic phosphonium, imidazolium, pyridinium, or quaternary ammonium-based ionic liquids, the corresponding phosphite, 1-subsituted imidazole, pyridine, or tertiary amine may be reacted with a suitable electrophile under alkylating conditions and then reacted with a suitable lithium salt. Suitable electrophiles include the silane moiety with linker bearing, e.g., a halide, mesylate, triflate or similar leaving group. Preparation of oxazolium and thizolium-based ionic liquids is similar, but requires deprotonation of the corresponding oxazole or thiazole with an appropriate base, e.g., an alkali metal hydride prior to reaction with the electrophile.

In an embodiment, this disclosure is directed to an electrolyte for an electrical energy storage device including an aprotic organic solvent; an alkali metal salt; an additive and an ionic ionic compound including an anion and cation, where the cation is attached to a silane functional group described in the above formula, and anion represents the anion of the ionic compound, which is selected from halides, nitrates, phosphates, imides, borates, and phosphazines. The weight ratio of the silane modified cation to anion in the ionic liquid or compound is about 4:1 to 1:4, preferably about 2.5:1 to 1:2.5.

In accordance with another aspect, there is provided an electrolyte for use in an energy storage device, the electrolyte including a room temperature ionic liquid as described herein.

In some embodiments, the electrolyte includes a lithium salt in addition to the ionic liquid. A variety of lithium salts may be used including for example, $Li[CF_3CO_2]$; $Li[C_2F_5CO_2]$; $Li[ClO_4]$; $Li[BF_4]$; $Li[AsF_6]$; $Li[PF_6]$; $Li[PF_2(C_2O_4)_2]$; $Li[PF_4C_2O_4]$; $Li[CF_3SO_3]$; $Li[N(CF_3SO_2)_2]$; $Li[C(CF_3SO_2)_3]$; $Li[N(SO_2C_2F_5)_2]$; lithium alkyl fluorophosphates; $Li[B(C_2O_4)_2]$; $Li[BF_2C_2O_4]$; $Li_2[B_{12}Z_{12-j}H_j]$; $Li_2[B_{10}X10_{-j'}H_{j'}]$; or a mixture of any two or more thereof, wherein Z is independently at each occurrence a halogen, j is an integer from 0 to 12 and j' is an integer from 1 to 10.

In some embodiments, the concentration of the lithium salt present in the ionic liquid ranges from about 0.01 M to about 1.5 M, from about 0.05 M to about 1.2 M, or from about 0.4 M to about 1.0 M. If the concentration of the ionic electrolyte salt is less than about 0.01 M, the ionic conductivity of the resulting non-aqueous electrolyte tends to decrease due to an inadequate number of carrier ions in the electrolyte.

In some applications of the present electrolyte, such as a formulation for a lithium ion battery, aprotic solvents are combined with the present ionic liquids to decrease the viscosity and increase the conductivity. Aprotic solvents lack exchangeable protons and include cyclic carbonic acid esters, linear carbonic acid esters, phosphoric acid esters, oligoether substituted siloxanes/silanes, cyclic ethers, chain ethers, lactone compounds, chain esters, nitrile compounds, amide compounds, sulfone compounds and the like. These solvents may be used singly, or at least two of them in admixture. Examples of aprotic solvents or carriers for forming the electrolyte systems include but are not limited to dimethyl carbonate, ethyl methyl carbonate, diethyl carbonate, methyl propyl carbonate, ethyl propyl carbonate, dipropyl carbonate, bis(trifluoroethyl) carbonate, bis(pentafluoropropyl) carbonate, trifluoroethyl methyl carbonate, pentafluoroethyl methyl carbonate, heptafluoropropyl methyl carbonate, perfluorobutyl methyl carbonate, trifluoroethyl ethyl carbonate, pentafluoroethyl ethyl carbonate, heptafluoropropyl ethyl carbonate, perfluorobutyl ethyl carbonate, etc., fluorinated oligomers, dimethoxyethane, triglyme, dimethylvinylene carbonate, tetraethyleneglycol, dimethyl ether, polyethylene glycols, sulfones, and gamma-butyrolactone. The aprotic solvent is present between about 5 wt. % to about 85 wt. % of the total electrolyte mass. The ionic liquid or compound is present between about 0.1 wt. % to about 85 wt. % of the total electrolyte mass, preferably about 20 to 75 wt. % of the total electrolyte mass.

In some embodiments, the electrolytes further include an electrode stabilizing additive to protect the electrodes from degradation. Thus, electrolytes of the present technology can include an electrode stabilizing additive that can be reduced or polymerized on the surface of a negative electrode to form a passivation film on the surface of the negative electrode. Likewise, electrolytes can include an electrode stabilizing additive that can be oxidized or polymerized on the surface of the positive electrode to form a passivation film on the surface of the positive electrode. In some embodiments, electrolytes of the present technology further include mixtures of the two types of electrode stabilizing additives. The additives are typically present at a concentration of about 0.001 to about 8 wt. %.

In some embodiments, an electrode stabilizing additive is a substituted or unsubstituted linear, branched or cyclic hydrocarbon including at least one oxygen atom and at least one aryl, alkenyl or alkynyl group. The passivating film formed from such electrode stabilizing additives may also be formed from a substituted aryl compound or a substituted or unsubstituted heteroaryl compound where the additive includes at least one oxygen atom. Alternatively, a combination of two additives may be used. In some such embodiments, one additive is selective for forming a passivating film on the cathode to prevent leaching of metal ions and the other additive can be selective for passivating the anode surface to prevent or lessen the reduction of metal ions at the anode.

Representative electrode stabilizing additives include 1,2-divinyl furoate, 1,3-butadiene carbonate, 1-vinylazetidin-2-one, 1-vinylaziridin-2-one, 1-vinylpiperidin-2-one, 1 vinylpyrrolidin-2-one, 2,4-divinyl-1,3-dioxane, 2 amino-3 vinylcyclohexanone, 2-amino-3-vinylcyclopropanone, 2 amino-4-vinylcyclobutanone, 2-amino-5-vinylcyclopentanone, 2-aryloxy-cyclopropanone, 2-vinyl[1,2]oxazetidine, 2 vinylaminocyclohexanol, 2-vinylaminocyclopropanone, 2 vinyloxetane, 2-vinyloxy-cyclopropanone, 3-(N-vinylamino)cyclohexanone, 3,5-divinyl furoate, 3-vinylazetidin-2-one, 3 vinylaziridin 2 one, 3 vinylcyclobutanone, 3 vinylcyclopentanone, 3 vinyloxaziridine, 3 vinyloxetane, 3-vinylpyrrolidin-2-one, 4,4 divinyl-3 dioxolan 2-one, 4 vinyltetrahydropyran, 5-vinylpiperidin-3-one, allylglycidyl ether, butadiene monoxide, butyl vinyl ether, dihydropyran-3-one, divinyl butyl carbonate, divinyl carbonate, divinyl crotonate, divinyl ether, divinyl ethylene carbonate, divinyl ethylene silicate, divinyl ethylene sulfate, divinyl ethylene sulfite, divinyl methoxypyrazine, divinyl methylphosphate, divinyl propylene carbonate, ethyl phosphate, methoxy-o-terphenyl, methyl phosphate, oxetan-2-yl-vinylamine, oxiranylvinylamine, vinyl carbonate, vinyl crotonate, vinyl cyclopentanone, vinyl ethyl-2-furoate, vinyl ethylene carbonate, vinyl ethylene silicate, vinyl ethylene sulfate, vinyl ethylene sulfite, vinyl methacrylate, vinyl phosphate, vinyl-2-furoate, vinylcylopropanone, vinylethylene oxide, .beta.-vinyl-.gamma.-butyrolactone, or a mixture of any two or more thereof. In some embodiments the electrode stabilizing additive may be a cyclotriphosphazene that is substituted with F, alkyloxy, alkenyloxy, aryloxy, methoxy, allyloxy groups, or combinations thereof. For example, the additive may be a (divinyl)-(methoxy)(trifluoro)cyclotriphosphazene, (trivinyl)(difluoro)(methoxy)cyclotriphosphazene, (vinyl)(methoxy)(tetrafluoro)cyclotriphosphazene, (aryloxy)(tetrafluoro)(methoxy)cyclotriphosphazene, (diaryloxy)(trifluoro)(methoxy)cyclotriphosphazene compounds, or a mixture of two or more such compounds. In some embodiments, the electrode stabilizing additive is vinyl ethylene carbonate, vinyl carbonate, or 1,2-diphenyl ether, or a mixture of any two or more such compounds.

Other representative electrode stabilizing additives may include compounds with phenyl, naphthyl, anthracenyl, pyrrolyl, oxazolyl, furanyl, indolyl, carbazolyl, imidazolyl, or thiophenyl groups. For example, electrode stabilizing additives may be aryloxpyrrole, aryloxy ethylene sulfate, aryloxy pyrazine, aryloxy-carbazole trivinylphosphate, aryloxy-ethyl-2-furoate, aryloxy-o-terphenyl, aryloxy-pyridazine, butyl-aryloxy-ether, divinyl diphenyl ether, (tetrahydrofuran-2-yl)-vinylamine, divinyl methoxybipyridine, methoxy-4-vinylbiphenyl, vinyl methoxy carbazole, vinyl methoxy piperidine, vinyl methoxypyrazine, vinyl methyl carbonate-allylanisole, vinyl pyridazine, 1-divinylimidazole, 3-vinyltetrahydrofuran, divinyl furan, divinyl methoxy furan, divinylpyrazine, vinyl methoxy imidazole, vinylmethoxy pyrrole, vinyl-tetrahydrofuran, 2,4-divinyl isooxazole, 3,4 divinyl-1-methyl pyrrole, aryloxyoxetane, aryloxy-phenyl carbonate, aryloxy-piperidine, aryloxy-tetrahydrofuran, 2-aryl-cyclopropanone, 2-diaryloxy-furoate, 4-allylanisole, aryloxy-carbazole, aryloxy-2-furoate, aryloxy-crotonate, aryloxy-cyclobutane, aryloxy-cyclopentanone, aryloxy-cyclopropanone, aryloxy-cycolophosphazene, aryloxy-ethylene silicate, aryloxy-ethylene sulfate, aryloxy-ethylene sulfite, aryloxy-imidazole, aryloxy-methacrylate, aryloxy-phosphate, aryloxy-pyrrole, aryloxyquinoline, diaryloxycyclotriphosphazene, diaryloxy ethylene carbonate, diaryloxy furan, diaryloxy methyl phosphate, diaryloxy-butyl carbonate, diaryloxy-crotonate, diaryloxy-diphenyl ether, diaryloxy-ethyl silicate, diaryloxy-ethylene silicate, diaryloxy-ethylene sulfate, diaryloxyethylene sulfite, diaryloxy-phenyl carbonate, diaryloxy-propylene carbonate, diphenyl carbonate, diphenyl diaryloxy silicate, diphenyl divinyl silicate, diphenyl ether, diphenyl silicate, divinyl methoxydiphenyl ether, divinyl phenyl carbonate, methoxycarbazole, or 2,4-dimethyl-6-hydroxy-pyrimidine, vinyl methoxyquinoline, pyridazine, vinyl pyridazine, quinoline, vinyl quinoline, pyridine, vinyl pyridine, indole, vinyl indole, triethanolamine, 1,3-dimethyl butadiene, butadiene, vinyl ethylene carbonate, vinyl carbonate, imidazole, vinyl imidazole, piperidine, vinyl piperidine, pyrimidine, vinyl pyrimidine, pyrazine, vinyl pyrazine, isoquinoline, vinyl isoquinoline, quinoxaline, vinyl quinoxaline, biphenyl, 1,2-diphenyl ether, 1,2-diphenylethane, o terphenyl, N-methyl pyrrole, naphthalene, or a mixture of any two or more such compounds. In some other embodiments, the electrolyte of the present technology includes an aprotic gel polymer carrier/solvent. Suitable gel polymer carrier/solvents include polyethers, polyethylene oxides, polyimides, polyphosphazines, polyacrylonitriles, polysiloxanes, polyether grafted polysiloxanes, derivatives of the foregoing, copolymers of the foregoing, cross-linked and network structures of the foregoing, blends of the foregoing, and the like, to which is added a suitable ionic electrolyte salt. Other gel-polymer carrier/solvents include those prepared from polymer matrices derived from polypropylene oxides, polysiloxanes, sulfonated polyimides, perfluorinated membranes (Nafion resins), divinyl polyethylene glycols, polyethylene glycol-bis-(methyl acrylates), polyethylene glycol-bis (methyl methacrylates), derivatives of the foregoing, copolymers of the foregoing, cross-linked and network structures of the foregoing.

The functional ionic liquids and the electrolytic solution containing the salt are high in electrical conductivity and solubility in organic solvents, and are suitable for use as an electrolytic solution for electrochemical devices. Examples of electrochemical devices are electric double-layer capacitor, secondary batteries, solar cells of the pigment sensitizer type, electrochromic devices, condenser, etc., which are nevertheless not limitative. Especially suitable as electrochemical devices are electric double-layer capacitor and secondary batteries such as lithium ion battery.

In yet another aspect, an electrochemical device is provided that includes a cathode; an anode; and an electrolyte including an ionic liquid as described herein. In one embodiment, the electrochemical device is a lithium secondary battery. In some embodiments, the secondary battery is a lithium battery, a lithium-ion battery, a lithium-sulfur battery, a lithium-air battery, a sodium ion battery, or a magnesium battery. In some embodiments, the electrochemical device is an electrochemical cell, such as a capacitor. In some embodiments, the capacitor is an asymmetric capacitor or supercapacitor. In some embodiments, the electrochemical cell is a primary cell. In some embodiments, the primary cell is a lithium/$MnO_2$ battery or Li/poly(carbon monofluoride) battery. In some embodiments, the electrochemical cell is a solar cell.

Suitable cathodes include those such as, but not limited to, a lithium metal oxide, spinel, olivine, carbon-coated olivine, $LiFePO_4$, $LiCoO_2$, $LiNiO_2$, $LiNi_{1-x}Co_yMet_zO_2$, $LiMn_{0.5}Ni_{0.5}O_2$, $LiMn_{0.3}Co_{0.3}Ni_{0.3}O_2$, $LiMn_2O_4$, $LiFeO_2$, $Li_{1+x}Ni_\alpha Mn_\beta Co_\gamma Met'_\delta O_{2-z'}F_{z'}$, $A_nB_2(XO_4)_3$ (NASICON), vanadium oxide; lithium peroxide, sulfur, polysulfide, a lithium carbon monofluoride (also known as LiCFx), or mixtures of any two or more thereof, where Met is Al, Mg, Ti, B, Ga, Si, Mn, or Co; Met' is Mg, Zn, Al, Ga, B, Zr, or Ti; A is Li, Ag, Cu, Na, Mn, Fe, Co, Ni, Cu, or Zn; B is Ti, V, Cr, Fe, or Zr; X is P, S, Si, W, or Mo; $0 \le x \le 0.3$, $0 \le y \le 0.5$, $0 \le z \le 0.5$, $0 \le x' \le 0.4$, $0 \le \alpha \le 1$, $0 \le \beta \le 1$, $0 \le \gamma \le 1$, $0 \le \delta \le 0.4$, and $0 \le z' \le 0.4$; and $0 \le h' \le 3$. According to some embodiments, the spinel is a spinel manganese oxide with the formula of $Li_{1+x}Mn_{2-z}Met'''_yO_{4-m}X'_n$, wherein Met''' is Al, Mg, Ti, B, Ga, Si, Ni, or Co; X' is S or F; and wherein $0 \le x \le 0.3$, $0 \le y \le 0.5$, $0 \le z \le 0.5$, $0 \le m \le 0.5$ and $0 \le n \le 0.5$. In other embodiments, the olivine has a formula of $Li_{1+x}Fe_{1-z}Met'_yPO_{4-m}X'_n$, wherein Met' is Al, Mg, Ti, B, Ga, Si, Ni, Mn or Co; X' is S or F; and wherein $0 \le x \le 0.3$, $0 \le y \le 0.5$, $0 \le z \le 0.5$, $0 \le m \le 0.5$ and $0 \le n \le 0.5$.

Suitable anodes include those such as lithium metal; graphitic materials, amorphous carbon, $Li_4Ti_5O_{12}$, tin alloys, silicon alloys, intermetallic compounds, or mixtures of any two or more such materials. Suitable graphitic materials including natural graphite, artificial graphite, graphitized meso-carbon microbeads (MCMB), and graphite fibers, as well as any amorphous carbon materials. In some embodiments, the anode and cathode are separated from each other by a porous separator.

The separator for the lithium battery often is a microporous polymer film. Examples of polymers for forming films include: nylon, cellulose, nitrocellulose, polysulfone, polyacrylonitrile, polyvinylidene fluoride, polypropylene, polyethylene, polybutene, or copolymers or blends of any two or more such polymers. In some instances, the separator is an electron beam treated micro-porous polyolefin separator. The electron treatment can improve the deformation temperature of the separator and can accordingly enhance the high temperature performance of the separator. Additionally, or alternatively, the separator can be a shut-down separator. The shut-down separator can have a trigger temperature above 130° C. to permit the electrochemical cells to operate at temperatures up to 130° C.

The disclosure will be further illustrated with reference to the following specific examples. It is understood that these examples are given by way of illustration and are not meant to limit the disclosure or the claims to follow.

EXAMPLE 1

Synthesis of Silyl Functional Ionic Liquid

Synthesis of N-methyltrimethylsilyl_pyrrolidine (NB2-107)

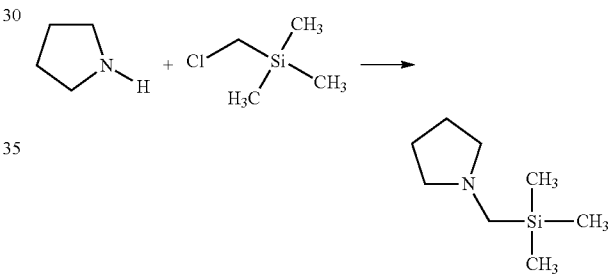

| Reagent | MW | Equiv | Mol | Mass (g) | Density | Volume (mL) | Conc | Yield (calc) |
|---|---|---|---|---|---|---|---|---|
| pyrrolidine | 71.12 | 1.00 | 0.028 | 2.0 | 0.852 | 2.3 | | |
| chloromethyltrimethylsilane | 122.67 | 1.00 | 0.028 | 3.4 | 0.89 | 3.9 | | |
| neat | | | | #DIV/0! | | #DIV/0! | | |
| K2CO3 | 138.21 | 1.02 | 0.029 | 4.0 | | | | |
| N-methyltrimethylsilyl_pyrrolidine | 157.29 | 1.00 | 0.000 | | | | | 4.4 |
| KCl | 74.55 | 1.00 | | | | | | 2.10 |
| KHCO3 | 100.11 | 1.00 | | | | | | 2.82 |

1. To a 20 mL vial equipped with a magnetic stirring bar was added potassium carbonate, pyrrolidine and chloromethyltrimethylsilane. No temperature increase was observed. The mixture stirred at RT and the overall reaction time was 5 days.
2. As the reaction proceeded, potassium carbonate was gradually consumed as it scavenged the liberated HCl to form potassium chloride (2.1 g) and potassium bicarbonate (2.8 g).
3. DCM (30 mL) was added and the solid collected by vacuum filtration, 5.2 g. The solvent was stripped by rotary evaporation. Yield: crude pale oil, 4.3 g (98%).
4. Characterization H$^+$NMR: (CDCl3) δ ppm 2.53 (m, 4H), 2.07 (s, 2H), 1.82 (m, 4H), 0.12 (s, 9H).

Ionic Liquid Synthesis of Pyr11Si(CH3)3-TFSI (NB2-109)

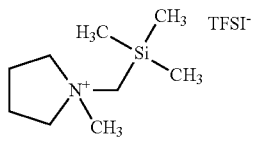

| Reagent | MW | Equiv | Mol | Mass (g) | Density | Volume (mL) | Conc | Yield (calc) |
|---|---|---|---|---|---|---|---|---|
| N-methyltrimethylsilyl_pyrrolidine | 157.29 | 1.00 | 0.027 | 4.3 | | #DIV/0! | | |
| methyliodide | 141.94 | 1.00 | 0.027 | 3.9 | 2.28 | 1.7 | | |
| acetonitrile | | | | 16.4 | 0.786 | 20.8 | 50% | |
| Pyr11TMS-I | 299.23 | 1.00 | 0.015 | 4.5 | | | | 8.2 |
| DI water | | | | 11.3 | 1.00 | 11.3 | 80% | |
| LiTFSI | 287.09 | 1.05 | 0.016 | 4.5 | | | | |
| Pyr11TMS-TFSI | 452.47 | | | | | | | 6.8 |

Quaternization

1. To a 250 mL 3-neck flask equipped with a magnetic stirring bar, water-cooled condenser, N2 inlet and thermocouple was added N-methyltrimethylsilyl pyrrolidine (NB2-107) and acetonitrile.
2. While stirring at RT, methyliodide was slowly added to the mixture and the internal temperature was monitored for evidence of exotherm. The temperature was maintained under 33° C.
3. The mixture slowly became a light yellow solution. The overall reaction time was about 2 h. The solvent was stripped by rotary evaporation to a yellow solid. Yield: pale yellow solid, 4.5 g (55%).

Metathesis (TFSI)

1. To a 100 mL capped bottle equipped with a magnetic stirring bar are added the iodide from step 1 and lithium bis(trifluoromethylsulfonyl)imide as two separate solutions, each dissolved in 20 mL DI water. The solutions are combined and a cloudy precipitate forms immediately, after which, a light yellow oil deposits on the bottom of the flask. The mixture stirred at RT for 1 h.
2. The water layer is decanted, DCM (20 mL) is added and the entire mixture is poured into a separatory funnel. The organic layer is washed with DI water (2×20 mL), separated, dried over MgSO4 and the solvent was stripped by rotary evaporation, pumped under high vacuum and by vacuum oven (5 mbar, 60° C.). Yield: pale oil, 6.0 g (88%).
3. Characterization H+NMR: (CDC13) δ ppm 3.58-3.51 (m, 4H), 3.09 (d, 5H), 2.29-2.26 (m, 4H), 0.28 (s, 9H).

EXAMPLE 2

Silyl Functionalized Ionic Liquid Electrolyte in an Electrochemical Device

Three electrolyte formulations were prepared in a dry argon filled glovebox by combining all the electrolyte components in a vial and stirring for 24 hours to ensure complete dissolution of the salts. For Comparative Electrolyte 1, 1 M of lithium hexafluorophosphate ("LiPF6") was combined with ethylene carbonate ("EC"), and ethyl methyl carbonate ("EMC") dissolved therein. For Comparative Electrolyte 2, 1 M of LiPF6 was combined with EC, EMC and ionic liquid 1-butyl-1-methyl-pyrrolidinium TFSI ("Pyr14TFSI"). For Electrolyte 3, 1 M of LiPF6 was combined with EC, EMC and silyl functionalized ionic liquid 1-methyl-trimethylsilyl-1-methyl-pyrrolidinium TFSI ("Pyr11TMSTFSI"). The electrolyte formulations prepared are summarized in Table 1.

TABLE 1

Electrolyte formulations

| Electrolyte | Base | Ionic liquid Structure |
|---|---|---|
| 1 (Comparative) | 1 M Li PF6 in combination with EC:EMC; in the weight ratio of 3:7 w/w | None |
| 2 (Comparative) | 1.2 M Li PF6 in combination with EC:EMC:Pyr14 TFSI; in the weight ratio of 2:4:2 w/w | [structure of Pyr14 TFSI] |
| 3 | 1.2 M Li PF6 in combination with EC:EMC:Pyr11 TMSTFSI; in the weight ratio of 2:4:2 w/w | [structure of Pyr11 TMSTFSI] |

Figure 2:
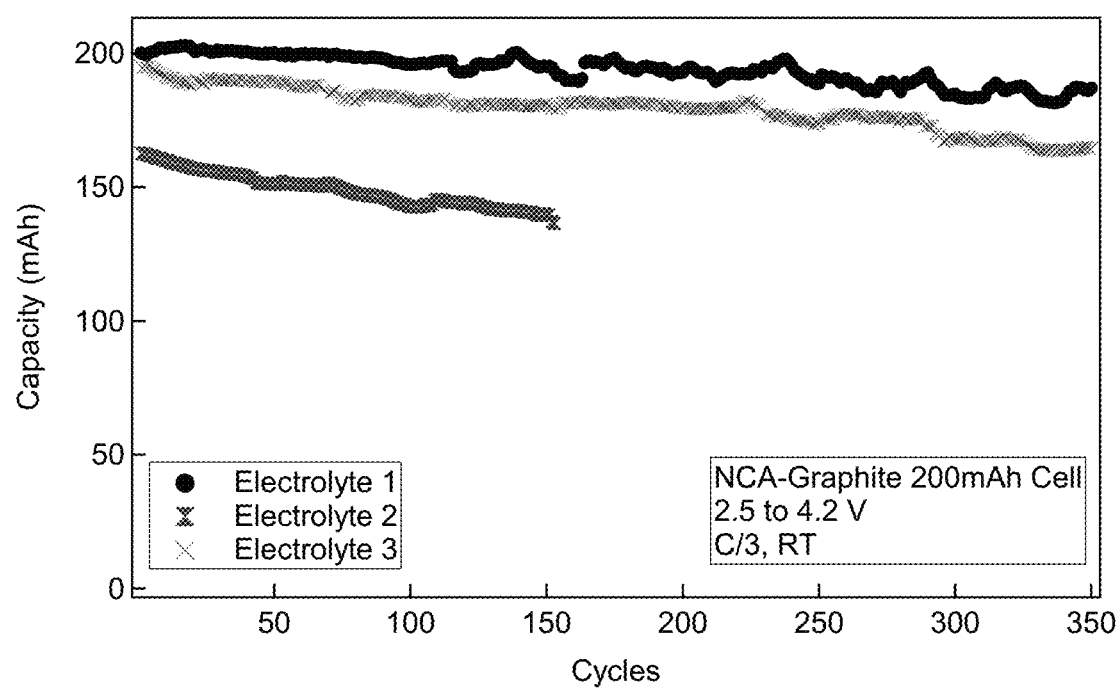
FIG. 2 is a graph of discharge capacity per cycle for Electrolytes 1-3.

The electrolyte formulations prepared herein were used as the electrolyte in Li-ion polymer pouch cells including Lithum nickel cobalt aluminium oxide cathode active material and graphite as the anode active material. In each cell, 1.1 g of electrolyte formulation was added and allowed to soak in the cell for 1 hour prior to vacuum sealing and testing. The cells were then charged to 4.2 V and discharged to 2.5 V at a C/15 rate for the first cycle, at C/5 rate for five cycles, and at C/3 rate until the cells reached 80% of the nominal capacity. The cells had a nominal capacity of 200 mAh at C/5. In Table 2, the initial capacity loss ("iCL"), defined as the ratio of the difference of the initial charge and discharge to the initial charge is demonstrated for each electrolyte. In FIG. 1, voltage profiles for the $5^{th}$ cycle attributed to each electrolyte is demonstrated. In FIG. 2, the discharge capacity measured at room temperature per cycle is demonstrated.

TABLE 2

Initial capacity losses as attributed to an electrolyte in NCA-Graphite 200 mAh Pouch cells

| Electrolyte | iCL (%) |
| --- | --- |
| 1 (Comparative) | 14.2 |
| 2 (Comparative) | 25.7 |
| 3 | 18.8 |

As shown in Table 2, the incorporation of ionic liquids changes the measured initial capacity loss, "iCL", typically associated with the decomposition of electrolyte material to form an interfacial organic layer at the anode. The high iCL associated with Comparative Electrolyte 2 is typical of electrolytes including materials incompatible with either the anode or cathode material, in this instance the anode. However, the incorporation of a silyl moiety on the pyrrolidinium ionic liquid as demonstrated by Electrolyte 3 results in a much lower initial capacity loss that is comparable to the iCL of Comparative Electrolyte 1.

Comparative Electrolyte 1 is a conventional commercial electrolyte including materials known to the state of the art. FIG. 1 illustrates a discharge profile of NCA-Graphite 200 mAh Pouch cells including ionic liquid electrolytes.

As shown in FIG. 1, Comparative Electrolyte 1 achieved the nominal capacity of the lithium ion cell, and Comparative Electrolyte 2, including a pyrrolidinium ionic liquid that is also known in the state of the art, demonstrated a poor discharge capacity, indicating an incompatibility with the cathode and anode materials in a typical lithium ion cell. Due to different transport dynamics of the electrolyte within a lithium ion pouch cell, Electrolyte 3 achieved a slightly lower but comparable discharge capacity relative to Comparative Electrolyte 1. Without wish to be bound by theory, the silyl function within the present ionic liquid enables Electrolyte 3 to be comparable to Comparative Electrolyte 1.

FIG. 2 demonstrates a room temperature cycle life comparison between a commercial electrolyte (Comparative Electrolyte 1), conventional IL-based electrolyte (Comparative Electrolyte 2) and a silyl functionalized IL-based electrolyte (Electrolyte 3). In FIG. 2, it is shown that Electrolyte 3 containing the silyl functionalized ionic liquid had superior performance in a lithium ion cell relative to that of conventional ionic liquids as demonstrated in Comparative Electrolyte 2. The point of failure for lithium ion cells known in the art is defined as 70 to 80% of the nominal capacity of the cell, and cells including Comparative Electrolyte 2 failing within the first 50 cycles. Electrolyte 3 demonstrates a comparable capacity retention and performance to Comparative Electrolyte 1.

Although various embodiments have been depicted and described in detail herein, it will be apparent to those skilled in the relevant art that various modifications, additions, substitutions, and the like can be made without departing from the spirit of the disclosure and these are therefore considered to be within the scope of the disclosure as defined in the claims which follow.

What is claimed:

1. An electrolyte for an electrical energy storage device comprising:
   an aprotic organic solvent;
   an metal salt;
   an additive; and
   an ionic compound comprising an ionic compound anion and ionic compound cation, wherein the ionic compound cation is attached to a functional group comprising a silane functional group according to Formula (I)

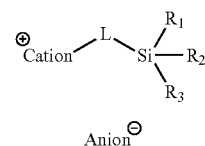

wherein the ionic compound cation comprises an onium, sulfonium, phosphonium, or any 5 or 6 membered heterocyclic ring having 1 to 3 heteroatoms as ring members selected from nitrogen, oxygen, silicon or sulfur;

$R_1$, $R_2$, $R_3$ are each independently methyl or $C_2$-$C_8$ alkyl, alkenyl, aryl, or alkynyl, groups;

L is a linker, which is a methylene or $C_2$-$C_8$ alkylene, alkenylene, alkynylene, esters, carbonylene, phenylene or arylene groups, comprising a bond to a P, Si, B, S, O, or N atom replacing a —C— in the linker, and excluding an O bond directly to the silane functional group according to Formula (I); and the ionic compound anion comprises a halide, nitrate, phosphate, imide, borate, or phosphazene.

2. The electrolyte formulation of claim 1, wherein the aprotic organic solvent comprises an open-chain or cyclic carbonate, carboxylic acid ester, nitrite, ether, sulfone, ketone, lactone, dioxolane, glyme, crown ether, or mixture thereof.

3. The electrolyte formulation of claim 1, wherein the metal salt comprises an alkali metal cation salt or aluminum or magnesium.

4. The electrolyte formulation of claim 3, wherein the alkali metal cation salt comprises lithium.

5. The electrolyte formulation of claim 1, wherein the additive comprises (1) sulfur-containing compounds, (2) phosphorous containing compounds, (3) boron containing compounds, (4) silicon containing compounds, (5) compounds containing unsaturated carbon-carbon bond, (6) carboxylic acid anhydrides or (7) mixtures thereof.

6. An electrolyte for an electrical energy storage device comprising:
   an aprotic organic solvent;
   an metal salt;
   an additive; and
   an ionic compound comprising an ionic compound anion and ionic compound cation, wherein the ionic compound cation is attached to a functional group comprising a silane functional group and a second functional group attached to the ionic compound cation according to Formula (II)

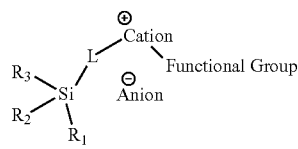

wherein, the second functional group represents a functional moiety comprising halides, oxygen, nitrogen, sulfur, phosphorus, esters, ethers, ketones, carbonyls, alkoxyalkanes, alkenes, aryls, nitriles, siloxanes, sulfones, thiols, phenols, hydroxyls, amines, imides, aldehydes, carboxylic acids, alkynes, carbonates, or anhydrides, wherein any of the carbon or hydrogen atoms in the moieties are further substituted with halides, oxygen, nitrogen, sulfur, phosphorus, alkanes, esters, ethers, ketones, carbonyls, alkoxyalkanes, alkenes, aryls, nitriles, siloxanes, sulfones, thiols, phenols, hydroxyls, amines, imides, aldehydes, carboxylic acids, alkynes, carbonates, or anhydrides, and wherein the ionic compound cation comprises an onium, sulfonium, phosphonium, or any 5 or 6 membered heterocyclic ring having 1 to 3 heteroatoms as ring members selected from nitrogen, oxygen, silicon or sulfur;

$R_1$, $R_2$, $R_3$ are each independently methyl or $C_2$-$C_8$ alkyl, alkenyl, aryl, or alkynyl, groups;

L is a linker, which is a methylene or $C_2$-$C_8$ alkylene, alkenylene, alkynylene, esters, carbonylene, phenylene or arylene groups, optionally comprising a bond to a P, halides, Si, B, S, O, or N atom replacing a —C— in the linker, and excluding an O bond directly to the silane functional group according to Formula (II); and the ionic compound anion comprises a halide, nitrate, phosphate, imide, borate, or phosphazene.

7. An electrolyte for an electrical energy storage device comprising:
an aprotic organic solvent;
an metal salt;
an additive; and
an ionic compound comprising an ionic compound anion and ionic compound cation, wherein the ionic compound cation is attached to a functional group comprising a silane functional group and a second silane functional group according to Formula (III)

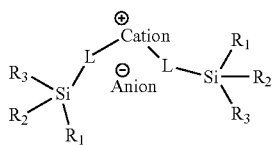

wherein the ionic compound cation comprises an onium, sulfonium, phosphonium, or any 5 or 6 membered heterocyclic ring having 1 to 3 heteroatoms as ring members selected from nitrogen, oxygen, silicon or sulfur;

$R_1$, $R_2$, $R_3$ are each independently methyl or $C_2$-$C_8$ alkyl, alkenyl, aryl, or alkynyl, groups;

L is a linker, which is a methylene or $C_2$-$C_8$ alkylene, alkenylene, alkynylene, esters, carbonylene, phenylene or arylene groups, optionally comprising a bond to a P, halides, Si, B, S, O, or N atom replacing a —C— in the linker, and excluding an O bond directly to the silane functional group and the second silane functional group according to Formula (III); and the ionic compound anion comprises a halide, nitrate, phosphate, imide, borate, or phosphazene.

8. The electrolyte formulation of claim 7, wherein the aprotic organic solvent comprises an open-chain or cyclic carbonate, carboxylic acid ester, nitrite, ether, sulfone, ketone, lactone, dioxolane, glyme, crown ether, or mixture thereof.

9. The electrolyte formulation of claim 7, wherein the metal salt comprises an alkali metal cation salt or aluminum or magnesium.

10. The electrolyte formulation of claim 9, wherein the alkali metal cation salt comprises lithium.

11. The electrolyte formulation of claim 7, wherein the additive comprises (1) sulfur-containing compounds, (2) phosphorous containing compounds, (3) boron containing compounds, (4) silicon containing compounds, (5) compounds containing unsaturated carbon-carbon bond, (6) carboxylic acid anhydrides or (7) mixtures thereof.

12. The electrolyte formulation of claim 6, wherein the aprotic organic solvent comprises an open-chain or cyclic carbonate, carboxylic acid ester, nitrite, ether, sulfone, ketone, lactone, dioxolane, glyme, crown ether, or mixture thereof.

13. The electrolyte formulation of claim 6, wherein the metal salt comprises an alkali metal cation salt or aluminum or magnesium.

14. The electrolyte formulation of claim 13, wherein the alkali metal cation salt comprises lithium.

15. The electrolyte formulation of claim 6, wherein the additive comprises (1) sulfur-containing compounds, (2) phosphorous containing compounds, (3) boron containing compounds, (4) silicon containing compounds, (5) compounds containing unsaturated carbon-carbon bond, (6) carboxylic acid anhydrides or (7) mixtures thereof.

* * * * *